United States Patent
Taureg

(10) Patent No.: US 6,581,741 B2
(45) Date of Patent: Jun. 24, 2003

(54) AXIAL SETTING DEVICE

(75) Inventor: Herbert Taureg, Hennef (DE)

(73) Assignee: GKN Viscodrive GmbH, Lohmar (DE)

( * ) Notice: Subject to any disclaimer, the term of this patent is extended or adjusted under 35 U.S.C. 154(b) by 0 days.

(21) Appl. No.: 09/826,687

(22) Filed: Apr. 5, 2001

(65) Prior Publication Data

US 2001/0027905 A1 Oct. 11, 2001

(30) Foreign Application Priority Data

Apr. 6, 2000 (DE) .......................... 100 17 131

(51) Int. Cl.$^7$ .................... F16D 43/284; B60K 17/35
(52) U.S. Cl. ..................... 192/35; 192/103 F
(58) Field of Search ................ 192/35, 103 F, 192/57, 58.41, 58.42, 85 AA; 307/118; 361/160; 475/88

(56) References Cited

U.S. PATENT DOCUMENTS

| | | | |
|---|---|---|---|
| 5,197,583 A | * 3/1993 | Sakai et al. | 192/103 F |
| 5,979,624 A | * 11/1999 | Chludek | 192/103 F |
| 6,145,644 A | * 11/2000 | Mohan et al. | 192/103 F |
| 6,299,538 B1 | * 10/2001 | Gassmann | 192/103 F |

FOREIGN PATENT DOCUMENTS

| | | |
|---|---|---|
| DE | 34 30 465 A1 | 5/1986 |
| DE | 44 44 027 A1 | 6/1996 |
| EP | 0 926 378 A2 | 6/1999 |
| JP | 10030656 A | 2/1998 |

* cited by examiner

Primary Examiner—Rodney H. Bonck
Assistant Examiner—Dennis Abdelnour

(57) ABSTRACT

An axial setting device for loading the friction plates of a coupling or for fixing the viscous plates of a coupling having two parts which are co-axially supported on a fixed housing and which are rotatable relative to one another. A pump assembly has housing parts that are connected to the one of the coupling parts and whose conveying elements are connected to the other one of the coupling parts in such a way that, when the parts rotate relative to one another, fluid is conveyed in the pump assembly. A reservoir is provided for fluid with a variable volume and a pressure chamber is delimited by an axial piston. A fluid connection is made from the reservoir to the chamber via the pump assembly and a fluid connection is made from the chamber to the reservoir via a bypass line with a solenoid valve.

5 Claims, 3 Drawing Sheets

AXIAL SETTING DEVICE

BACKGROUND OF THE INVENTION

The invention relates to an axial setting device especially for loading the friction plates of a friction coupling or for fixing the shear plates of a viscous coupling. Two coupling parts are co-axially supported in a housing and which are rotatable relative to one another. A pump assembly has housing parts that are connected to the one of the coupling parts and whose conveying elements are connected to the other one of the coupling parts in such a way that, when the parts rotate relative to one another, fluid is conveyed in the pump assembly. A reservoir for fluid has a variable volume and a pressure chamber is delimited by an axial piston. A fluid connection is made from the reservoir to the pressure chamber via the pump assembly and a pressure line and a fluid connection is made from the pressure chamber to the reservoir via a bypass line with a solenoid valve.

Axial setting devices of this type are used, for example, for actuating friction couplings with alternately arranged first and second friction plates, wherein first friction plates of the friction coupling are connected in a rotationally fast way to the first one of the coupling parts and wherein second friction plates of the friction coupling are connected in a rotationally fast way to the second one of the coupling parts. The friction plates, in their entirety, at one end, are axially supported on one of the coupling parts. The friction plates, in their entirety, are loaded at their other end by the axial piston of the axial setting device. Axial setting devices of this type are also used in viscous couplings with alternately arranged first and second shear plates wherein first shear plates of the viscous coupling are connected in a rotationally fast way to the first one of the coupling parts, and wherein second shear plates of the viscous coupling are arranged so as to be freely rotatable relative to the two coupling parts. Clamping rings with a thickness greater than that of the first shear plates are arranged between the second shear plates and connected to the second one of the parts in a rotationally fast way, wherein the second shear plates and the clamping rings, in their entirety can be axially supported at one end on one of the coupling parts, with the second shear plates and the clamping rings, in their entirety, being loadable at their other end by the axial piston of the axial setting device.

Coupling assemblies of this type are used in the drivelines of motor vehicles with one permanently driven axle, with the other axle being driven when required, and are arranged in such a way that they connect the optionally driven axle as a function of the differential speed. This means that if a slip occurs at the permanently driven axle, which slip leads to a speed differential between the two axles, the multi-plate coupling is closed so that the further axle is also driven. A device of this type is known from DE 198 60 532 A1.

It has already been proposed in connection with such a device that fluid conveyed by the pump assembly can be conveyed from the pressure chamber back into the reservoir by a controlled bypass line. However, this only serves to control any excess pressure via an excess pressure valve. An example of such a device is found in DE 195 05 800 A1.

Furthermore, it is known, in principle, that these devices require an externally controllable disconnecting function to be compatible with ABS systems (brake anti-blocking system) or ESP systems (vehicle electronic stability program). Magnetically controllable, mechanical unlocking devices suitable for this purpose are described in DE 39 11 122 C1, for example.

According to the state of the art, disconnection of coupling assemblies of this type in the driveline, as required for ABS and ESP systems, is normally effected by an axial setting device arranged in a stationary housing, which housing is supported against a rotating part of the coupling by means of an axial bearing under load. The disadvantage of such an assembly is that the differential speed of an axial bearing loaded in this way is identical to the speed of the coupling, as a result of which the service life of the entire coupling unit is limited. One example of such an embodiment is the so-called Fladex Limited Slip Coupling. Another example of the so-called Powr-Lok® coupling.

SUMMARY OF THE INVENTION

It is the object of the invention to provide an axial setting device which achieves the external disconnecting function by simple means. The objective is achieved in that in the fixed housing there is arranged a primary coil which can be excited by external control means, that in one of the parts, there is arranged a secondary coil which can be excited by the primary coil in a contact-free way and that the solenoid valve can be controlled in the opening sense by the secondary coil when excited by the primary coil. The pump assembly can be provided in the form of a gear pump or of a shear pump (Visco Lok® system) or in the form of an axial piston pump. In an extremely advantageous way, the assembly for actuating the solenoid valve in the bypass line leading to the pump assembly is completely free from friction and, with the exception of the solenoid valve, it is completely free from wear.

In order to ensure that the assembly functions, even in those cases where the parts of the axial setting device and thus, as a rule, also the parts of the coupling assembly, do not rotate, it is necessary to provide the primary coil with an alternating field. If it is assumed that the necessary action is only necessary in the case of a driving speed, it is sufficient to excite the primary coil with DC voltage.

It can be assumed that, normally, the solenoid valve is controlled only in accordance with an opening and closing function. However, without departing from the concept of the invention, it is also conceivable to provide a control valve whose opening cross-section is increased as a function of a differential-speed-dependent control voltage.

The particular advantage of the inventive setting device consists in its extremely spontaneous reaction, which permits a return of the setting in times of less than 20 msec.

BRIEF DESCRIPTION OF THE DRAWINGS

Two preferred embodiments of the invention will be described below with reference to the Figures wherein.

DETAILED DESCRIPTION OF THE PREFERRED EMBODIMENTS

Figure 1:
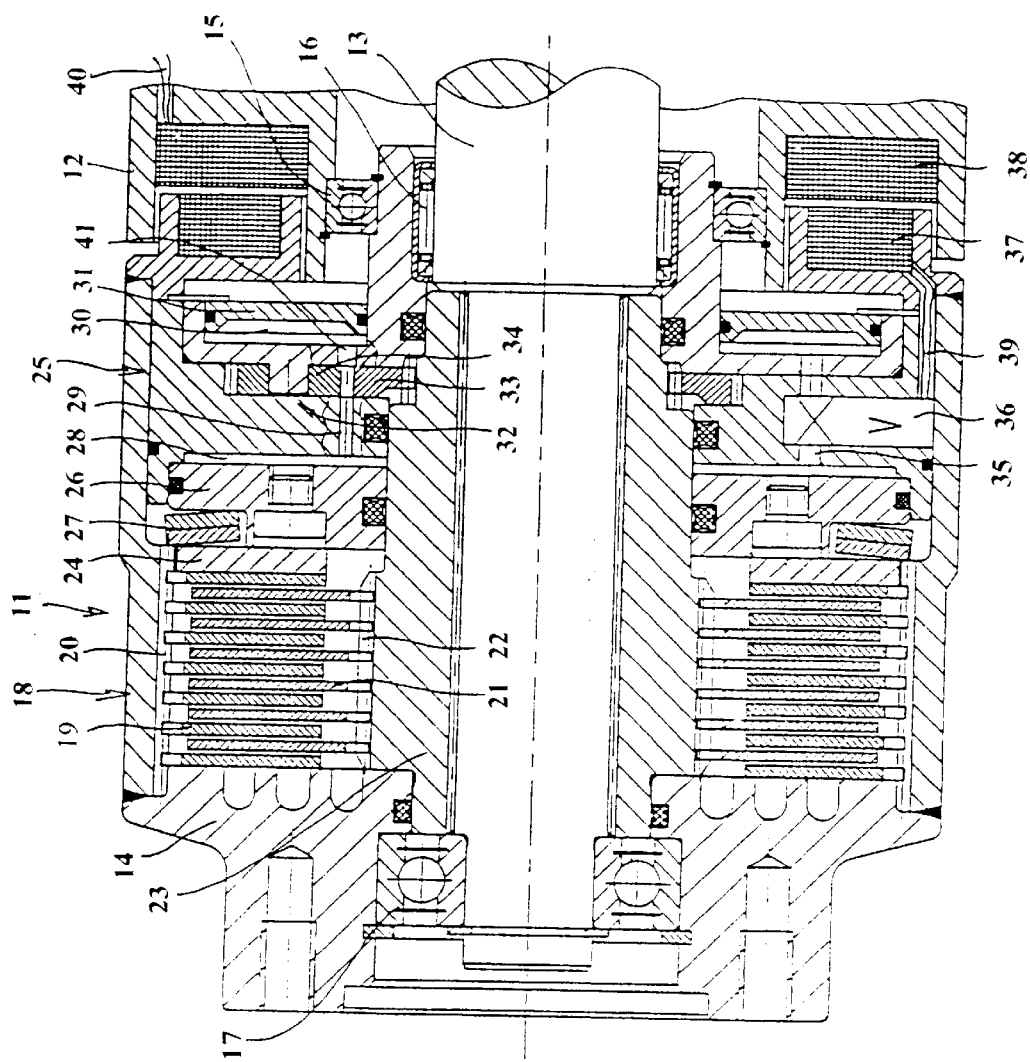
FIG. 1 shows an the axial setting device assembled in a friction coupling.

FIG. 1 shows a coupling device 11 in which a multi-plate coupling 18 is provided with an axial setting device 25. The coupling device 11 formed in this way is supported in a fixed housing 12 of which only portions are shown. The coupling device 11 comprises two parts, i.e. a shaft 13 and a carrier 14 which two parts are rotatable relative to one another. A ball bearing 15 serves to support the coupling device in the housing 12. A needle bearing 16 and a ball bearing 17 serve to support the shaft 13 and the carrier 14 relative to one another. The multi-plate coupling 18 comprises outer plates 19 which are held directly in a rotationally fast way in the carrier 14 on inner toothing 20, as well as inner plates 21 which are held directly in a rotationally fast way on outer toothing 22 of a hub member 23. The hub member 23 is connected to the shaft 13 by engaging teeth. The plates are supported on an end wall of the carrier 14; they are axially loaded by a pressure plate 24 which is acted upon by an axial piston 26 of the axial setting device 25. The axial piston 26 is supported via plate springs 27 on the carrier 14 and, at the opposite end, delimits the pressure chamber 28 which, through a pressure line 29 and by a gear pump 32, is supplied with fluid which is conveyed through a suction line 41 (arranged in a different sectional plane) from a reservoir 30 in the carrier 14.

The reservoir 30 is formed by part of the carrier 14 and delimited by an annular cylinder 31. The gear pump comprises a sun gear 33 connected to the hub member 23, and a planetary gear 34 supported in the carrier 14. A bypass line 35 controllable by a solenoid valve 36 extends from the pressure chamber 28 to the reservoir 30. Via a line 39, the solenoid valve 36 is controlled by a secondary coil 37 which is accommodated inside the carrier 14. The secondary coil 37 is excited in a contact-free way by a primary coil 38 which is firmly arranged in the housing 12 and which is supplied with current through a line 40. The mode of operation of the coupling assembly is mostly known. If there exists a relative speed between the shaft 13 and the carrier 14, the gear pump 32 starts operating and conveys a medium from the reservoir 30 into the pressure chamber 28. As a result, the axial piston 26 is slid against the returning force of the spring 27 on to the pressure plate 24 which compresses the package of plates of the friction coupling 18 and thus brakes the carrier 14 relative to the hub 23 to the shaft 13. As a result of such relative braking, the conveying action of the pump ceases, so that the plate springs 27 push the piston 26 back again, and the coupling 18 opens slowly. While these processes take place, the solenoid valve 36 is closed. When the primary coil 38 is excited, the secondary coil 37 is excited at the same time in a contact-free way and opens the solenoid valve. As a result, medium can immediately flow from the pressure chamber 28 via the bypass line 35 into the reservoir 30, so that the previously described action of the axial piston 26 being urged back by the plate springs 27 takes place abruptly as compared to the previously described slow return via the pressure line and the gear pump 32.

Figure 2:
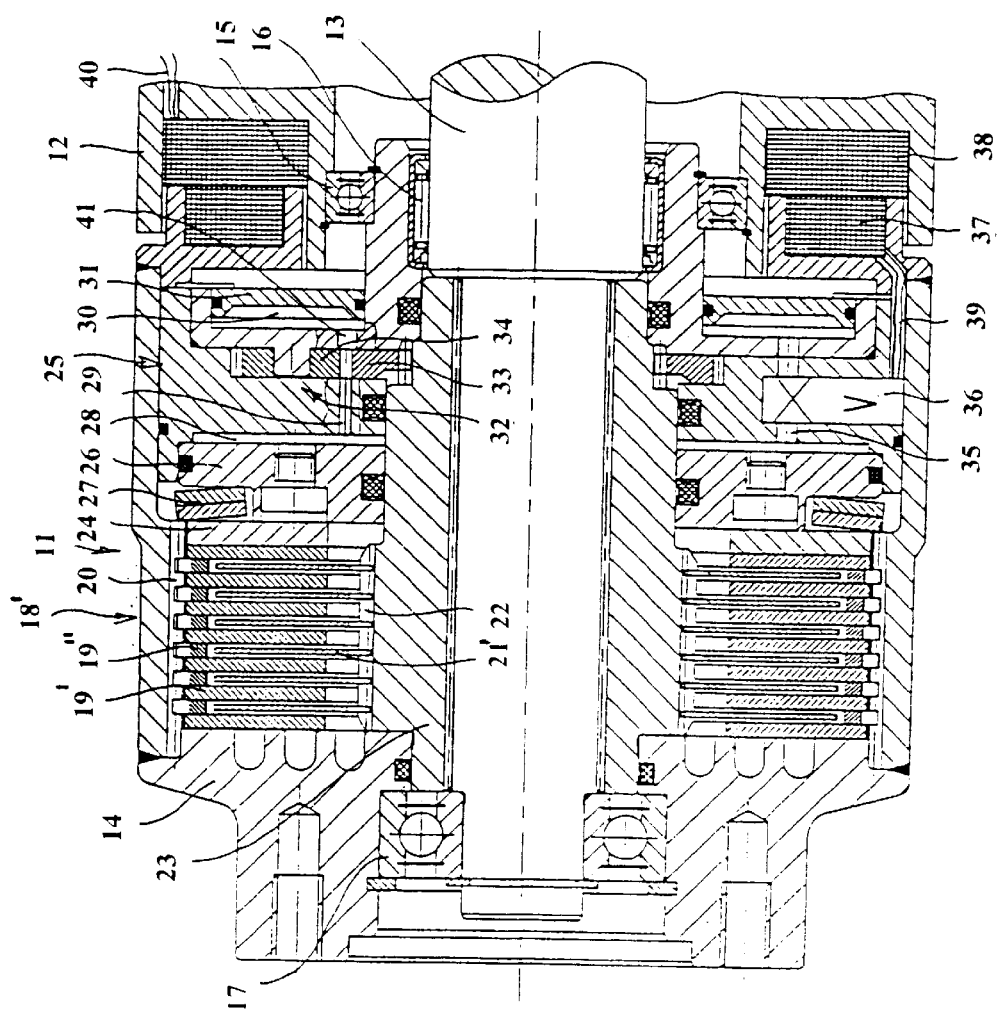
FIG. 2 shows an the axial setting device assembled in a viscous coupling.
Figure 3:
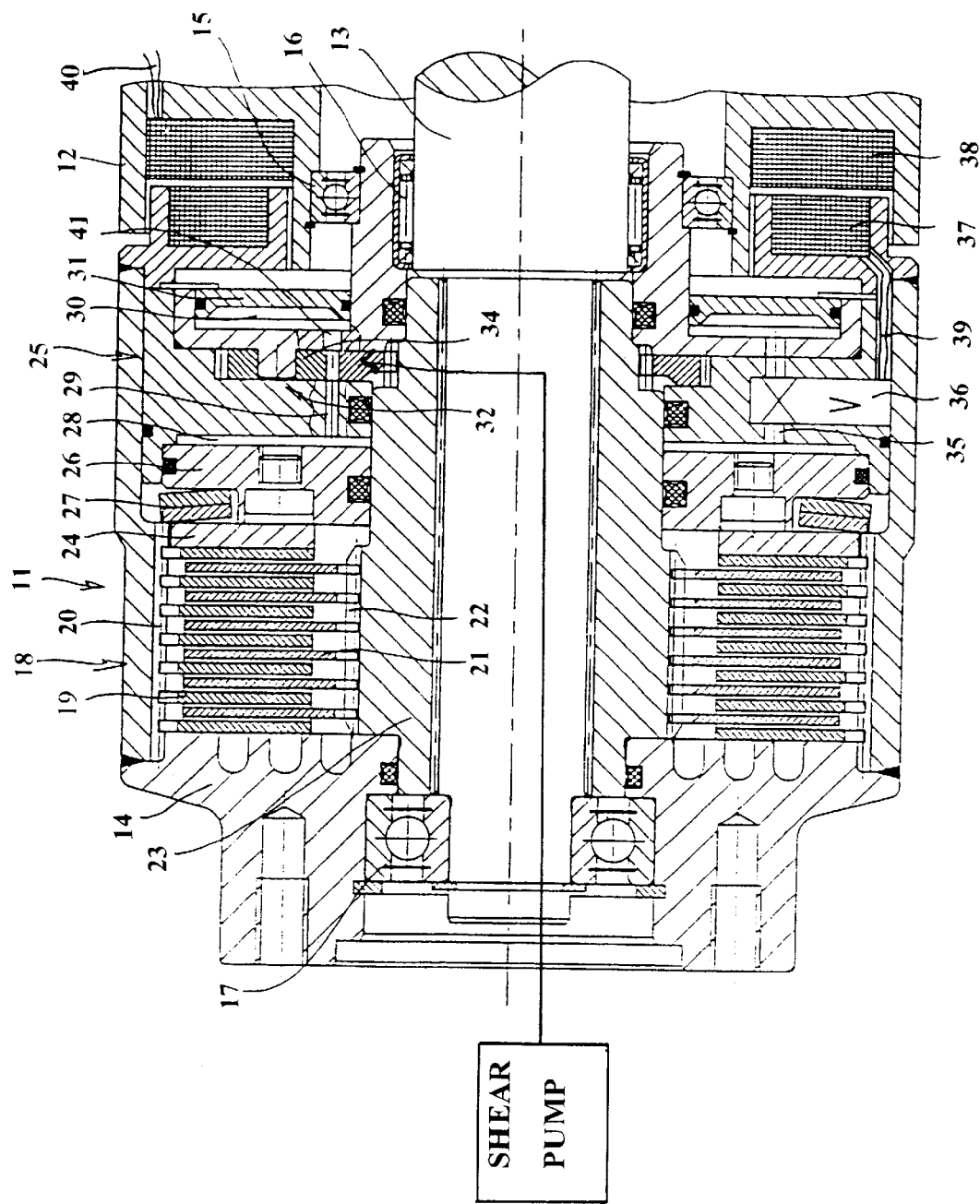
FIG. 3 shows an axial setting device similar to FIGS. 1 and 2 with a shear pump.

FIG. 2 shows a coupling device 11 in which a viscous coupling 18' is provided with an axial setting device 25. The coupling device 11 formed in this way is supported in a fixed housing 12 of which only portions are shown. The coupling device 11 comprises two parts, i.e. a shaft 13 and a carrier 14 which two parts are rotatable relative to one another. A bearing 15 serves to support the coupling device 11 in the housing 12. A needle bearing 16 and a ball bearing 17 serve to support the shaft 13 and the carrier 14 relative to one another. The viscous coupling 18' comprises outer plates 19' and spacing plates 19" which are held directly in a rotationally fast way in the carrier 14 on inner toothing 20, as well as inner plates 21' which are held directly in a rotationally fast way on outer toothing 22 of a hub member 23. The thickness of the spacing plates 19" is greater than that of the inner plates 21'. The hub member 23 is connected to the shaft 13 by engaging teeth. The plates are supported on an end wall of the carrier 14; they are axially loaded by a pressure plate 24 which is acted upon by an axial piston 26 of the axial setting device 25. The axial piston 26 is supported via plate springs 27 on the carrier 14 and, at the opposite end, delimits the pressure chamber 28 which, through a pressure line 29 and by a gear pump 32, is supplied with fluid which is conveyed through a suction line 41 (arranged in a different sectional plane) from a reservoir 30 in the carrier 14. The reservoir 30 is formed by part of the carrier 14 and and delimited by an annular cylinder 31. The gear pump comprises a sun gear 33 connected to the hub member 23, and a planetary gear 34 supported in the carrier 14. A bypass line 35 controllable by a solenoid valve 36 extends from the pressure chamber 28 to the reservoir 30. Via a line 39, the solenoid valve 36 is controlled by a secondary coil 37 which is accommodated inside the carrier 14.

The secondary coil 37 is excited in a contact-free way by a primary coil 38 which is firmly arranged in the housing 12 and which is supplied with current through a line 40. The mode of operation of the coupling assembly is mostly known. If there exists a relative speed between the shaft 13 and the carrier 14, the gear pump 32 starts operating and conveys a medium from the reservoir 30 into the pressure chamber 28. As a result, the axial piston 26 is slid against the returning force of the spring 27 on to the pressure plate 24 which compresses the package of plates of the friction coupling 18 and thus brakes the carrier 14 relative to the hub 23/to the shaft 13. As a result of such relative braking, the conveying action of the pump ceases, so that the plate springs 27 push the piston 26 back again, and the coupling 18 opens slowly. While these processes take place, the solenoid valve 36 is closed. When the primary coil 38 is excited, the secondary coil 37 is excited at the same time in a contact-free way and opens the solenoid valve. As a result, medium can immediately flow from the pressure chamber 28 via the bypass line 35 into the reservoir 30, 50 that the previously described action of the axial piston 26 being urged back by the plate springs 27 takes place abruptly as compared to the previously descried slow return via the pressure line and the gear pump 32.

I claim:

1. An axial setting device for loading the friction plates of a friction coupling or for fixing the viscous plates of a viscous coupling comprising: two coupling parts which are co-axially supported in a fixed housing and which coupling parts are rotatable relative to one another, a pump assembly whose housing parts are connected to the one of the coupling parts and whose conveying elements are connected to the other one of the coupling parts in such a way that, when the coupling parts rotate relative to one another, fluid is conveyed in the pump assembly, a reservoir for fluid with a variable volume, a pressure chamber delimited by an axial piston, a fluid connection from the reservoir to the pressure chamber via the pump, assembly and a pressure line, a fluid connection from the pressure chamber to the reservoir via a bypass line with a solenoid valve, said fixed housing having a primary coil which can be excited by external control means, and in one of the coupling parts, there is arranged a secondary coil which can be excited by the primary coil in a contact-free way and that the solenoid valve can be controlled in the opening sense by the secondary coil when excited by the primary coil.

2. An axial setting device according to claim 1, wherein said pump assembly is a gear pump.

3. An axial setting device according to claim 1, wherein said pump assembly is a shear pump.

4. An axial setting device according to any one of the claims 1, 2, or 3 in a friction coupling with alternately arranged first and second friction plates, wherein said first friction plates of the friction coupling are connected to the first one of the coupling parts in a rotationally fast way, said second friction plates of the friction coupling are connected to the second one of the coupling parts in a rotationally fast way, and wherein said friction plates, in their entirety, are axially supported at one end on one of the coupling parts and that said friction plates, in their entirety, are loaded at the other end by said axial piston.

5. An axial setting device according to any one of claims 1, 2, or 3 in a viscous coupling with alternately arranged first and second shear plates, wherein said first shear plates of the viscous coupling are connected to the first one of the coupling parts in a rotationally fast way, said second shear plates of the viscous coupling are arranged so as to be freely rotatable relative to the coupling parts, and wherein clamping rings with a thickness greater than that of the first shear plates are arranged between said second shear plates and connected in a rotationally fast way said second one of the coupling parts, and wherein said second shear plates and said clamping rings, in their entirety, are axially supported at one end on one of the coupling parts, and that said second shear plates and said clamping rings, in their entirety, can be loaded at the other end by said axial piston.

* * * * *

UNITED STATES PATENT AND TRADEMARK OFFICE
CERTIFICATE OF CORRECTION

PATENT NO. : 6,581,741 B2
DATED : June 24, 2003
INVENTOR(S) : Matsutani et al.

It is certified that error appears in the above-identified patent and that said Letters Patent is hereby corrected as shown below:

<u>Column 4,</u>
Line 53, please delete the comma "," after "pump".

Signed and Sealed this

Fourth Day of November, 2003

JAMES E. ROGAN
*Director of the United States Patent and Trademark Office*

UNITED STATES PATENT AND TRADEMARK OFFICE
CERTIFICATE OF CORRECTION

PATENT NO. : 6,581,741 B2
DATED : June 24, 2003
INVENTOR(S) : Herbert Taureg

It is certified that error appears in the above-identified patent and that said Letters Patent is hereby corrected as shown below:

<u>Column 4,</u>
Line 53, please delete the comma "," after "pump".

This certificate supersedes Certificate of Correction issued November 4, 2003.

Signed and Sealed this

Second Day of March, 2004

JON W. DUDAS
*Acting Director of the United States Patent and Trademark Office*